United States Patent [19]

Ukihashi et al.

[11] 4,116,888

[45] Sep. 26, 1978

[54] PROCESS FOR PRODUCING FLUORINATED COPOLYMER HAVING ION-EXCHANGE GROUPS

[75] Inventors: Hiroshi Ukihashi, Tokyo; Tatsuro Asawa, Yokohama; Masaaki Yamabe, Machida; Haruhisa Miyake, Yokohama, all of Japan

[73] Assignee: Asahi Glass Company Ltd., Tokyo, Japan

[21] Appl. No.: 739,728

[22] Filed: Nov. 8, 1976

[51] Int. Cl.² .............................................. C08F 2/06
[52] U.S. Cl. ...................................... 521/31; 526/245; 526/246; 526/247; 526/240; 528/27; 528/38
[58] Field of Search ................... 260/2.1 R; 526/245, 526/246

[56] References Cited

U.S. PATENT DOCUMENTS

| | | | |
|---|---|---|---|
| 3,041,317 | 6/1962 | Gibbs et al. | 260/79.3 M |
| 3,503,945 | 3/1970 | Kim | 526/245 |
| 3,624,250 | 11/1971 | Carlson | 526/247 |
| 3,853,720 | 12/1974 | Korach et al. | 204/295 |
| 3,985,501 | 10/1976 | Grot | 260/2.2 R |

FOREIGN PATENT DOCUMENTS

| | | | |
|---|---|---|---|
| 2,243,866 | 3/1973 | Fed. Rep. of Germany | 204/296 |
| 2,510,071 | 11/1975 | Fed. Rep. of Germany | 204/296 |

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A fluorinated copolymer having 1 to 50 mole % of a component having functional group of carboxylic acid group or a group which can be converted to carboxylic acid group, is produced by copolymerizing a fluorinated ethylenic unsaturated monomer and a functional monomer having the functional group in the presence of a polymerization initiator source in 0 to 10 mole of an inert organic solvent per 1 mole of the functional monomer under the pressure of higher than 6 kg/cm² whereby the copolymer having high molecular weight ($T_Q$ of higher than 150° C) and an ion exchange capacity of 0.5 to 4 meq/g dry polymer is produced.

6 Claims, No Drawings

PROCESS FOR PRODUCING FLUORINATED COPOLYMER HAVING ION-EXCHANGE GROUPS

BACKGROUND OF THE INVENTION

1. Field of the Invention

The present invention relates to a process for producing a fluorinated copolymer having ion-exchange groups. More particularly, it relates to a process for producing a fluorinated copolymer having carboxylic acid type cation exchange groups which is effectively used as a diaphragm of an ion exchange membrane in an electrolysis of an aqueous solution of electrolytes, by a copolymerization without using a solvent or in an organic solvent.

2. Description of Prior Art

It has been known to produce sodium hydroxide in a cathode compartment by partitioning the anode compartment and the cathode compartment and feeding an aqueous solution of sodium chloride etc. into the anode compartment to electrolyze it as a diaphragm electrolysis.

Recently, it has been proposed to use a cation exchange membrane which does not substantially pass the electrolyte and selectively pass alkali metal ions instead of an asbestos diaphragm.

It has been especially proposed to use the fluorinated cation exchange membrane having high alkali resistance and chlorine resistance.

For example, it has been known to use cation exchange membranes of fluorinated polymers having carboxylic acid groups or sulfonic acid groups as the ion exchange group. (Japanese Unexamined patent publication Nos. 37395/1973 and 120492/1975).

It has been found that when the cation exchange membrane of the carboxylic acid type fluorinated copolymer is used in a diaphragm electrolysis of an aqueous solution of alkali metal chloride, an alkali metal hydroxide having high purity can be obtained and the operation in high current efficiency and high current density can be attained and high concentration of an alkali metal hydroxide can be obtained in a cathode compartment.

It has been found excellent characteristic that higher than 90% of the current efficiency can be given even though the concentration of sodium hydroxide is higher than 40%.

However, it has not been found any proposal to advantageously produced the fluorinated polymers having carboxylic acid type cation exchange groups.

The inventors have found that in order to attain the abovementioned high electrolytic characteristics, it is important to provide an ion exchange capacity of the fluorinated polymer having ion-exchange groups in a range of 0.5 to 4 meq/g dry polymer, preferably 0.8 to 3 meq/g dry polymer, especially 1.0 to 2.2 meq/g dry polymer (meq = milli-equivalent) and to provide higher molecular weight.

When the ion exchange capacity is increased, the molecular weight of the fluorinated polymer has been lowered whereby the mechanical strength (such as ultimate tensile strength and ultimate elongation) of a membrane thereof.

The inventors have studied with the above-mentioned knowledge to provide an advantageous process for producing a fluorinated polymer having carboxylic acid type cation exchange groups especially a fluorinated polymer having high molecular weight and high ion exchange capacity.

As the result, it has been found that a desired fluorinated polymer can be obtained by copolymerizing a fluorinated olefin and a fluorinated monomer having carboxylic acid type functional group with or without an inert organic solvent.

SUMMARY OF THE INVENTION

It is an object of the present invention to provide a process for producing a fluorinated copolymer having ion exchange groups which has high ion exchange capacity and high molecular weight.

Another object of the invention is to provide a process for smoothly producing a fluorinated copolymer in high copolymerizing reaction velocity.

The other object of the invention is to provide a fluorinated cation exchange membrane which can be used as a diaphragm for producing an alkali metal hydroxide having high concentration in high purity under high current efficiency in an electrolysis of an alkali metal chloride.

These objects of the invention can be attained by providing a process for producing a fluorinated copolymer having ion-exchange groups which has 1 to 50 mole % of a component having a functional group of carboxylic acid group or a group which can be converted to carboxylic acid group, by copolymerizing a fluorinated ethylenic unsaturated monomer and a functional monomer having the functional group in the presence of a polymerization initiator source wherein the copolymerization is carried out in 0 to 10 mole of an inert organic solvent per 1 mole of the functional monomer under the pressure of higher than 6 kg/cm² whereby the copolymer having the below defined $T_Q$ of higher than 150° C. and an ion exchange capacity of 0.5 to 4 meq/g dry polymer (meq = milli-equivalent) is produced.

DETAILED DESCRIPTION OF THE PREFERRED EMBODIMENTS

The term of $T_Q$ is defined as follows.

The term of $T_Q$ relates to a molecular weight of the copolymer and is a temperature to result a melt volumetric flow rate of 100 mm³/second. The volumetric melt flow rate is a rate of the molten copolymer flowed out from an orifice having a diameter of 1 mm and a length of 2 mm at a specific temperature under the pressure of 30 kg/cm² and is shown by a unit of mm³/second.

In the process of the invention, it is important to use the functional monomer having a functional group of carboxylic acid or a group which can be converted to carboxylic acid group.

The carboxylic acid type functional monomers (I) are preferably fluorovinyl compounds from the viewpoints of the chlorine resistance and oxidation resistance of the resulting copolymer.

Suitable functional monomers are fluorovinyl compounds having the formula

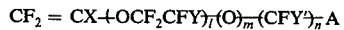

wherein $l$ is 0 to 3; $m$ is 0 to 1; $n$ is 0 to 12; X represents —F or —CF₃; Y and Y' respectively represent —F or a $C_{1-10}$ perfluoroalkyl group; A represents —CN, —COF, —COOH, —COOR₁, —COOM or —COONR₂R₃; R₁ represents a $C_{1-10}$ alkyl group; R₂ and R₃ respectively represent —H or $R_1$; M represents an alkali metal atom or a quaternary ammonium group.

From the viewpoints of the property and availability, it is preferable to use the fluorovinyl compound having the above-mentioned formula wherein X is —F; Y is —$CF_3$; Y' is —F; $l$ is 0 to 1; $m$ is 0 to 1; $n$ is 0 to 8.

From the viewpoint of the copolymerization reaction, it is preferable to use the fluorovinyl compound having the formula wherein A is —COF or —$COOR_1$ and $R_1$ is a $C_{1-5}$ alkyl group.

Typical fluorovinyl compounds include $CF_2 = CFO(CF_2)_{1-8}COOCH_3$,
$CF_2 = CFO(CF_2)_{1-8}COF$,
$CF_2 = CFO(CF_2)_{1-8}COOC_2H_5$,
$CF_2 = CF(CF_2)_{0-8}COOCH_3$,
$CF_2 = CFOCF_2CF(CF_3)OCF_2CF_2CF_2COOCH_3$, and
$CF_2 = CFOCF_2CF(CF_3)OCF_2CF_2CF_2COF$.

Suitable fluorinated ethylenic unsaturated monomers (II) include $C_2F_4$, $C_2F_3Cl$, $C_3F_6$, $C_2HF_3$, $C_2H_2F_2$ and $C_2H_3F$.

The fluorinated ethylenic unsaturated monomers are preferably fluorinated olefins having the formula $$CF_2 = CZZ'$$

wherein Z and Z' respectively represent —F, —Cl, —H or —$CF_3$. It is preferable to use a perfluoroolefine especially tetrafluoroethylene.

In the process of the invention, it is possible to use two or more types of the functional monomers (I) and the ethylenic unsaturated monomers (II), respectively.

It is also possible to add one or more other monomer such as an olefin compound (III) having the formula $$CH_2 = CR_4R_5$$

wherein $R_4$ and $R_5$ respectively represent —H, a $C_{1-8}$ alkyl group or an aromatic ring;

a fluorovinyl ether having the formula $$CF_2 = CFOR_f$$

wherein $R_f$ represents a $C_{1-10}$ perfluoroalkyl group; a divinyl monomer e.g. $CF_2 = CF—CF = CF_2$ and $CF_2 = CFO(CF_2)_{1-4}OCF = CF_2$ and the other functional monomers e.g. a sulfonic acid type functional monomer.

Suitable olefins (III) include ethylene, propylene, butene-1, isobutylene, styrene, α-methyl styrene, pentene-1, hexene-1, heptene-1, 3-methyl butene-1, 4-methyl pentene-1, etc..

From the viewpoints of the manufacture and property of the resulting copolymer, it is especially preferable to use ethylene, propylene, isobutylene, etc.

When a divinyl monomer or the like is added, the resulting copolymer is crosslinkable and the mechanical strength of the membrane made of the crosslinked copolymer is improved.

The ratio of the functional monomer (I), the fluorinated olefin (II), and the olefin compound (III) and the other component are important because it relates to characteristics of a cation exchange membrane for an electrolytic cell.

The content of the functional monomer (I) is important and directly relates to an ion exchange capacity and is preferably 1 to 50 mole %, preferably 3 to 35 mole %, especially 5 to 30 mole %.

When the content of the functional monomer (I) is too high, the resulting cation exchange membrane has disadvantageously low mechanical strength and low ion exchangeability caused by the increase of the water content.

When the content of the functional monomer (I) is too low, the ion exchangeable function is disadvantageously negligible.

The fluorinated olefin (II), the olefin compound (III) and the other compound are the residual components in the copolymer. The content of the olefin (III) is important and relates to the electrical and mechanical properties and the chlorine resistance of the resulting cation exchange membrane.

Accordingly, when the olefin compound (III) is added, the molar ratio of the olefin compound (III) to the fluorinated olefin (I) is preferably 5/95 to 70/30, especially 10/90 to 60/40.

When the fluorovinyl ether or the divinyl ether is added, it is preferable to give a content of the fluorovinyl ether or the divinyl ether of less than 30 mole % preferably 2 to 20 mole % in the copolymer.

The ion exchange capacity of the copolymer can be in a range of 0.5 to 4 meq/g dry polymer. It is special characteristic that even though the ion exchange capacity is large, the molecular weight of the resulting copolymer can be high whereby the mechanical strength and durability of the copolymer can be high enough.

The ion exchange capacity is dependent upon the type of the copolymer in the above-mentioned range and is preferably 0.8 to 3 meq/g dry polymer, especially 1.0 to 2.2 meq/g dry polymer, from the viewpoints of the mechanical and electrochemical properties as the cation exchange membrane.

The molecular weight of the copolymer produced by the process of the invention is important and relates to the mechanical properties and the fabricatability of the cation exchange membrane.

When it is shown by the value of $T_Q$, it is usual to have $T_Q$ of higher than 150° C. preferably 170° to 340° C. especially about 180° to 300° C.

In the process of the invention, it is important to carry out the copolymerization of the functional monomer and the fluorinated olefin with or without using a specific amount of an inert organic solvent.

It is the optimum to carry out the bulk polymerization in which any inert organic solvent is not used. When an inert organic solvent is used, it is important to carry out by using less than 10 mole preferably less than 5 mole per 1 mole of the functional monomer.

When the amount of the inert organic solvent is too much, the reaction velocity in the copolymerization is remarkably low whereby it is difficult to obtain high yield of the copolymer. Sometimes, no copolymer is obtained. When the amount of the inert organic solvent is too much, it is difficult to produce the copolymer having high molecular weight when the copolymer having high ion exchange capacity is produced.

Moreover, the following disadvantages are found when a large amount of the inert organic solvent is used. For example, the large size of the reactor is required and the disadvantageous operations such as the complicated recovery of the solvent are required.

Accordingly, in the process of the invention, it is usual to use less than 5 moles especially less than 3 moles of the inert organic solvent per 1 mole of the functional monomer in the copolymerization. It is the optimum that the inert organic solvent is not used (0 mole of the solvent) as the optimum result is attained for the object of the invention.

In the process of the invention, it is important to carry out the copolymerization under the pressure of higher than 6 kg/cm². When the pressure for the copolymerization is lower than 6 kg/cm², it is difficult to maintain the reaction velocity for the copolymerization in enough high level and to produce the copolymer having high molecular weight. When the pressure for copolymerization is too low, the ion exchange capacity of the resulting copolymer is too high whereby the mechanical strength and the ion exchangeability are lowered by the increase of the water content.

The pressure for copolymerization is preferably selected from the range of less than 50 kg/cm², from the viewpoints of the reactor and the operations in the industrial process. Even though higher pressure for copolymerization can be employed, the effect of the invention is not proportionally improved by increasing the pressure. Accordingly, the pressure for copolymerization is usually in a range of 6 to 50 kg/cm² preferably 9 to 30 kg/cm².

The inert organic solvents used in the process of the invention can be various solvents which do not inhibit the copolymerization of the fluorinated olefin with the specific functional monomer and have not high chain transfer property. It is preferable to use a fluorinated or chlorofluorinated saturated hydrocarbon as the solvent. Suitable fluorinated or chlorofluorinated saturated hydrocarbons include ones having 1 to 4 carbon atoms such as dichlorodifluoromethane, trichloromonofluoromethane, dichloromonofluoromethane, monochlorodifluoromethane, chlorotrifluoromethane, trichlorotrifluoroethane, dichlorotetrafluoroethane, fluorochloropropane, perfluoropropane, perfluorocyclobutane and mixtures thereof.

In the process of the invention, it is preferable to use the solvents of fluorinated or chlorofluorinated saturated hydrocarbons having no hydrogen atom in the molecule, especially trichlorotrifluoroethane.

It is also possible to use the other organic solvents such as tertiary butanol, methanol, acetic acid etc. in the process of the invention.

In the copolymerization of the invention, the reaction condition, the other condition and the operation are not specifically limited and can be selected from wide ranges. For example, the optimum reaction temperature for copolymerization can be selected depending upon the type of the polymerization initiator source, the inert organic solvent or the molar ratio of the components in the reaction, etc.. In usual, high or low temperature is not advantageous in the industrial process and accordingly, it is selected from the range of 20° to 90° C. preferably about 30° to 80° C.

Thus, it is preferable to select the polymerization initiator source which imparts high activity at the reaction temperature in the process of the invention.

It is possible to use ionized high energy radiation at room temperature however, it is preferable to use an azo compound or a peroxy compound in the industrial process.

Suitable polymerization initiator sources are compounds having high activity at about 20° to 90° C. under the reaction pressure for copolymerization and include azo compounds such as azobisisobutyronitrile; acyl peroxides such as benzoyl peroxide, lauroyl peroxide; peroxy esters such as t-butyl peroxy isobutylate, t-butyl peroxy pivarate; peroxy dicarbonates such as diisopropyl peroxydicarbonate, di-2-ethylhexyl peroxydicarbonate; and fluorinated initiators such as dipentafluoroporpionyl peroxide, ditetrafluoropropionyl peroxide, etc.. The known oil soluble peroxides may be also used.

In the process of the invention, the concentration of the polymerization initiator is usually in a range of 0.01 to 3 wt. % preferably 0.003 to 1 wt. % to total monomers.

The molecular weight of the resulting copolymer can be increased and high ion exchange capacity can be kept by decreasing the concentration of the polymerization initiator. When the concentration of the polymerization initiator is too high, the molecular weight of the copolymer is decreased to cause disadvantages for the production of the copolymer having high ion exchange capacity and high molecular weight.

The copolymerization of the invention is usually carried out as follows.

In an autoclave, the carboxylic acid type functional monomer and the polymerization initiator and if necessary the inert organic solvent are charged. The oxygen in the autoclave is purged and it is kept at a desired temperature, and the fluorinated olefin is introduced to the specific pressure to react them. After the reaction, the unreacted fluorinated olefin is purged and the copolymer is separated by precipitating it by adding the slurry of the copolymer into hexane, etc..

In the process of the invention, it is preferable to carry out the copolymerization under controlling the concentration of the resulting copolymer to less than 30 wt. % preferably less than 25 wt. %. When the concentration is too high, the disadvantages of high load for stirring, difficulty of heat removal and insufficient absorption and diffusion of the fluorinated olefin gas are found.

The copolymer of the invention can be processed to form a membrane by desired methods. For example, the functional group is converted to carboxylic acid group by the hydrolysis, if necessary. The hydrolysis can be carried out before or after the fabrication of a membrane. It is usually preferable to hydrolyze it after the fabrication of a membrane.

The fabrication of a membrane can be carried out by various methods such as a heat melt molding method, a casting method using a solvent solution of the copolymer and other known methods.

The cation exchange membranes made of the copolymers of the invention have excellent characteristics and can be used in various fields, various objects and various usages. For example, they can be preferably used in the field in which the anticorrosion is required, as a diaphragm for a diffusion dialysis, an electrolytic reduction and a fuel cell.

When it is used as a cation selective diaphragm for an electrolysis of alkali metal compound, high characteristics which could not be attained by using the conventional cation exchange membrane can be imparted.

Thus, in the case of the two compartment cell wherein an anode compartment and a cathode compartment are formed by partitioning the anode and the cathode with the cation exchange membrane made of the fluorinated copolymer of the invention, and an aqueous solution of an alkali metal chloride is fed into the anode compartment to electrolyze it to obtain an alkali hydroxide from the cathode compartment, it is possible to produce sodium hydroxide having high concentration of higher than 40% in high current efficiency of higher than 90% by electrolyzing an aqueous solution of sodium chloride having a concentration of higher than 2N under the current density of 5 to 50A/dm$^2$.

It is also possible to attain the electrolysis in low cell voltage of lower than 4.5 volts.

A further understanding can be obtained by reference to certain specific examples which are provided herein for purposes of illustration only and are not intended to be limiting unless otherwise spcified.

In the examples, an ion exchange capacity of a cation exchange membrane was measured as follows.

A H-type cation exchange membrane was immersed into 1N—HCl at 60° C. for 5 hours to completely convert it to H-type membrane, and then the membrane was washed with water so as to be free of HCl. Then, 0.5 g of the H-type membrane was immersed into a solution prepared by adding 25 ml of water to 25 ml of 0.1N—NaOH. Then, the membrane was taken out and the amount of NaOH in the solution was measured by a back titration with 0.1N—HCl.

In the examples, the air purge was carried out in vacuum under cooling with liquid nitrogen.

EXAMPLE 1

In a 100 ml autoclave made of stainless steel, 100 g of methyl perfluoro-5-oxa-6-heptenoate and 10 mg of azobisisobutyronitrile were charged.

The air was purged in vacuum under cooling with liquid nitrogen and then, the mixture was heated to 70° C. Then, tetrafluoroethylene was fed from a gas inlet into the autoclave to the pressure of 21 kg/cm$^2$ to initiate the reaction. The reaction pressure for copolymerization was kept in 21 kg/cm$^2$ by continuously feeding tetrafluoroethylene to continue the copolymerization for 6.1 hours. The resulting slurry of the copolymer had the concentration of 16.3 wt. %. Enough amount of hexane was added to the slurry and the copolymer was separated by a filtration. As the result, 18.0 g of white copolymer was obtained. The copolymer had $T_Q$ of 235° C. and was press-molded at 240° C. and was hydrolyzed to obtain a cation exchange membrane having an ion exchange capacity of 1.38 meq/g polymer.

Two compartment type electrolytic cell was prepared by partitioning an anode compartment and a cathode compartment with the cation exchange membrane and using an anode made of titanium coated with rhodium and a cathode made of stainless steel with a space of electrodes of 2.2 cm and an effective area of the membrane of 25 cm$^2$. The electrolysis of sodium chloride was carried out under the following conditions.

The anode compartment was filled with 4N—NaCl aq. solution and the cathode compartment was filled with 8N—NaOH aq. solution. The electrolysis was carried out by feeding respectively 4N—NaCl aq. solution at a rate of 150 cc/hour into the anode compartment and 0.1N—NaOH aq. solution into the cathode compartment under the current density of 20 A/dm$^2$ at 92° C. of the temperature of the solution in a pH of 3 of the anolyte. The aqueous solution of sodium chloride was overflowed from the anode compartment and on the other hand, an aqueous solution of sodium hydroxide overflowed from the cathode compartment was collected.

The current efficiency was measured from the amount of the resulting sodium hydroxide. As the result, 14N—NaOH aq. solution was obtained in the current efficiency of 93%. The cell voltage was 4.1 volts and the cation exchange membrane had the stable characteristics for a long time.

EXAMPLE 2

In a 500 ml autoclave made of stainless steel, 500 g of CF$_2$ = CFO(CF$_2$)$_3$COOCH$_3$ and 50 mg of azobisisobutyronitrile were charged.

The air was purged in vacuum and the mixture was heated to 70° C. and tetrafluoroethylene was fed to the pressure of 19.3 kg/cm$^2$ to initiate the reaction. During the reaction, tetrafluoroethylene was continuously fed to maintain the reaction pressure to 19.3 kg/cm$^2$. After the reaction for 6.5 hours, 87.5 g of the copolymer was obtained. The resulting slurry of the copolymer had the concentration of 16.0 wt. %. The copolymer had $T_Q$ of 210° C. and was press-molded at 210° C. and was hydrolyzed to obtain a cation exchange membrane having an ion exchange capacity of 1.51 meq/g polymer.

The electrolysis of sodium chloride was repeated by the process of Example 1 except using the cation exchange membrane to obtain 14N—NaOH aq. solution in the current efficiency of 92% under the cell voltage of 3.7 volts.

EXAMPLE 3

In a 100 ml autoclave made of stainless steel, b 72 g of CF$_2$ =0 CFO(CF$_2$)$_3$COOCH$_3$ and 22 g of trichlorotrifluoroethane and 190 mg of azobisisobutyronitrile were charged.

The air was purged in vacuum and the mixture was heated to 70° C. and tetrafluoroethylene was fed to the pressure of 20 kg/cm$^2$ to initiate the reaction. During the reaction, tetrafluoroethylene was continuously fed to maintain the reaction pressure to 20 kg/cm$^2$. After the reaction for 3 hours, 18.2 g of the copolymer was obtained. The copolymer had $T_Q$ of 220° C., and was press-molded and hydrolyzed to obtain a cation exchange membrane having an ion exchange capacity of 1.20 meq/g polymer.

The electrolysis of sodium chloride was repeated by the process of Example 1 except using the cation exchange membrane to obtain 14N—NaOH aq. solution in the current efficiency of 93% and the cell voltage of 4.3 volts.

EXAMPLE 4

In a 100 ml autoclave, 60 g of CF$_2$ = CFO(CF$_2$)$_3$COOCH$_3$,

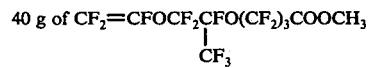

and 10 mg of azobisisobutyronitrile were charged.

The air was purged in vacuum and the mixture was heated to 70° C. and tetrafluoroethylene was fed to the pressure of 19.5 kg/cm$^2$ to initiate the reaction. During the reaction, tetrafluoroethylene was continuously fed to maintain the reaction pressure to 19.5 kg/cm$^2$. After the reaction for 6.8 hours, 17.6 g of the copolymer was obtained. The copolymer had $T_Q$ of 190° C. and was press-molded at 190° C. and was hydrolyzed to obtain a cation exchange membrane having a thickness of 300μ and an ion exchange capacity of 1.31 meq/g polymer.

The electrolysis of sodium chloride was repeated by the process of Example 1 except using the cation exchange membrane to obtain 14N—NaOH aq. solution in the current efficiency of 93% and the cell voltage of 4.1 volts.

EXAMPLE 5

In a 100 ml autoclave made of stainless steel, 100 g of $CF_2 = CFO(CF_2)_4COOCH_3$ and 40 mg of azobisisobutyronitrile were charged.

The air was purged in vacuum and the mixture was heated to 70° C. and tetrafluoroethylene was fed to the pressure of 15.8 kg/cm$^2$ to initiate the reaction. During the reaction, tetrafluoroethylene was continuously fed to maintain the reaction pressure to 15.8 kg/cm$^2$. After the reaction for 11 hours, 13 g of the copolymer was obtained. The copolymer had $T_Q$ of 185° C. and was press-molded at 190° C. and was hydrolyzed to obtain a cation exchange membrane having an ion exchange capacity of 1.64 meq/g polymer.

The electrolysis of sodium chloride was repeated by the process of Example 1 except using the cation exchange membrane to obtain 14N—NaOH aq. solution in the current efficiency of 91% and the cell voltage of 3.6 volts.

EXAMPLE 6

In a 100 ml autoclave, 100 g of $CF_2 = CFO(CF_2)_3COOCH_3$ and 80 mg of t-butyl peroxyisobutyrate were charged.

The air was purged in vacuum and the mixture was heated to 70° C. and a mixture of tetrafluoroethylene and ethylene was fed to the pressure of 19.0 kg/cm$^2$ to initiate the reaction. During the reaction, a mixed gas of tetrafluoroethylene and ethylene (a molar ratio of 90/10) was continuously fed to maintain the reaction pressure to 19.0 kg/cm$^2$. After the reaction for 4.0 hours, 16.5 g of the copolymer was obtained. The copolymer had $T_Q$ of 205° C. and was press-molded at 210° C. and was hydrolyzed to obtain a cation exchange membrane having a thickness of 300μ and an ion exchange capacity of 1.62 meq/g polymer.

The electrolysis of sodium chloride was repeated by the process of Example 1 except using the cation exchange membrane to obtain 14N—NaOH aq. solution in the current efficiency of 91% and the cell voltage of 3.6 volts.

Reference 1

In a 100 ml autoclave made of stainless steel, 10 g of $CF_2 = CFO(CF_2)_3COOCH_3$ and 90 g of trichlorotrifluoroethane and 190 mg of azobisisobutyronitrile were charged.

The air was purged in vacuum and the mixture was heated to 70° C. and tetrafluoroethylene was fed to the pressure of 5 kg/cm$^2$ to initiate the reaction. The reaction was continued for 20 hours under maintaining the pressure of 5 kg/cm$^2$ to obtain 2.1 g of the copolymer. The copolymer had $T_Q$ of 80° C. and was hydrolyzed to obtain an ion exchange resin having an ion exchange capacity of 1.20 meq/g polymer. However, it was difficult to obtain a film without a supporter.

Reference 2

In a 100 ml autoclave made of stainless steel, 8 g of $CF_2 = CFO(CF_2)_3COOCH_3$ and 92 g of trichlorotrifluoroethane and 190 mg of azobisisobutyronitrile were charged.

The air was purged in vacuum and the mixture was heated at 70° C. and tetrafluoroethylene was fed to the pressure of 3 kg/cm$^2$.

After the reaction for 20 hours, a copolymer was not substantially obtained.

What is claimed is:

1. A fluorinated copolymer consisting essentially of 1-50 mole % of a functional fluorovinyl monomer having the formula:

wherein $l$ is 0 to 3; $m$ is 0 or 1; $n$ is 0 to 12; X represents —F or —CH$_3$; Y and Y' represent —F or a C$_{1-10}$ perfluoroalkyl group; A represents —CN, COF, —COOH, COOR$_1$, COOM, or CONR$_2$R$_3$; R$_1$ represents a C$_{1-10}$ alkyl group; R$_2$ and R$_3$ represent —H or —R$_1$; M represents an alkali metal atom or a quaternary ammonium group;

and 50–99 mole % of a copolymerizable fluorinated ethylenically unsaturated monomer, characterized by having the combination of properties of a $T_Q$ greater than 150° C. and an ion exchange capacity of 0.5 to 4 meq/g of dry polymer;

and which is produced by copolymerizing the constituent monomer in 0 to 10 moles of an inert organic solvent per 1 mole of said functional monomer under a pressure greater than 6 Kg/cm$^2$.

2. The fluorinated copolymer of claim 1 wherein A represents —COOH.

3. The fluorinated copolymer of claim 1 wherein said fluorovinyl monomer has the formula:

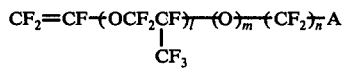

wherein $l$ is 0 or 1; $m$ is 0 or 1; $n$ is 0 to 8; A represents —COF or COOR$_1$; and R$_1$ represents a C$_{1-5}$ alkyl group.

4. The fluorinated copolymer of claim 1, wherein said copolymerizable ethylenically unsaturated monomer is a fluorinated olefin having the formula:

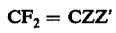

wherein Z and Z' represent —F, —Cl, —H, or CF$_3$.

5. The fluorinated copolymer of claim 3, wherein said ethylenically unsaturated monomer is tetrafluoroethylene.

6. A fluorinated copolymer consisting essentially of 1-50 mole % of a functional fluorovinyl monomer having the formula:

wherein $l$ is 0 to 3; $m$ is 0 to 1; $n$ is 0 to 12; X represents —F or —CH$_3$; Y and Y' represent —F or a C$_{1-10}$ perfluoroalkyl group; A represents —CN, COF, —COOH, COOR$_1$, COOM, or CONR$_2$R$_3$; R$_1$ represents a C$_{1-10}$ alkyl group; R$_2$ and R$_3$ represent —H or —R$_1$; M represents an alkali metal atom or a quaternary ammonium group;

and 50–99 mole % of a copolymerizable fluorinated ethylenically unsaturated monomer, characterized by having the combination of properties of a $T_Q$ greater than 150° C. and an ion exchange capacity of 0.5 to 4 meq/g of dry polymer.

* * * * *